July 17, 1928.
A. J. PETERSON
CULTIVATOR TEETH
Original Filed Sept. 25, 1926
1,677,596
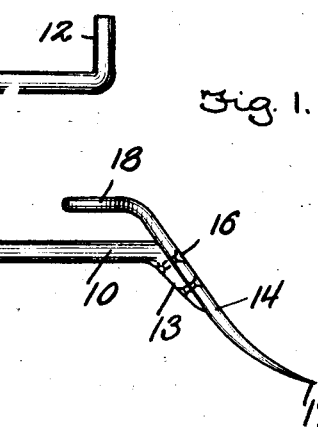
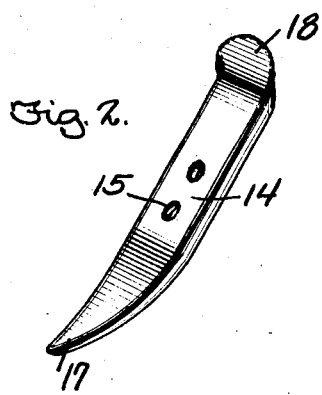
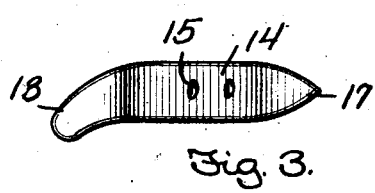
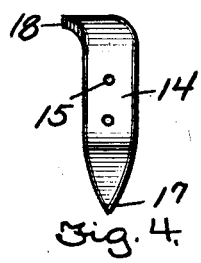
Alfred J. Peterson, Inventor
Witnesses Patented July 17, 1928.

1,677,596

UNITED STATES PATENT OFFICE.

ALFRED J. PETERSON, OF ELAND, WISCONSIN.

CULTIVATOR TEETH.

Application filed September 25, 1926, Serial No. 137,739. Renewed June 7, 1928.

The present invention relates to improvements in agricultural implements and has for its primary object to provide a cultivator designed to destroy quack or couch grass and similar weed growth.

A further object of the invention is to provide a cultivator formed so as to engage the grass and cause it to be deposited upon the surface of the ground.

Another object of the invention is the provision of a cultivator particularly designed to engage and elevate sub-surface weed growth and permanently destroy the same.

Still another object of the invention is the provision of a cultivator of the above type which is simple and durable of construction and which can be manufactured at a relatively low cost.

Other objects and advantages of the invention will become apparent as the description progresses.

In the accompanying drawing forming a part of this specification and in which like reference characters are employed to designate corresponding parts of the same:

Figure 1 is a side elevational view of a cultivator constructed in accordance with my invention, Figure 2 is a perspective view of the cultivator blade, Figure 3 is a top plan view of the blade member, and, Figure 4 is a front elevational view of the blade.

Referring to the drawing, wherein for the purpose of illustration is shown a preferred embodiment of my invention, the numeral 10 generally designates the cultivator support which is formed with a U-shaped standard 11 formed from a metallic bar. The body 11 formed from a metallic bar. The U-shaped body is normally arranged in a horizontal position and is provided at its upper end with an upwardly projecting arm 12 adapted for connection upon a cultivator carrier frame. The lower end of the U-shaped body 11 projects slightly forward of the upper end and is provided with a downwardly inclined flattened bracket 13 having spaced openings formed therethrough. This bracket is arranged to durably support a cultivator blade 14.

The blade 14 is of durable metallic construction and of elongated form, being provided in its intermediate portion with a pair of spaced openings 15 formed so as to align with the openings formed in the bracket 13. The blade is rigidly connected to the bracket by means of a rivet 16 or any similar manner. The lower extremity of the blade 14 is tapered and beveled to form a comparatively sharp point 17, this pointed end of the blade being curved slightly forward as shown to advantage in Figure 1. As will be readily noted, from Figure 1 of the drawing, the blade 14 is arranged at an angular inclination of approximately forty-five degrees, having a long pointed end projecting forwardly while the upper end is bent at an obtuse angle to provide a rigidly extending blade 18 disposed in a horizontal plane and curved slightly to form a lateral offset.

From the foregoing description and the drawing, it will be noted that a cultivator attachment particularly designed for removing subsurface weed growth has been produced. The present cultivator embodies a standard 10 having a rearwardly offset U-shaped body to the forward portion of which is rigidly secured a cultivator blade 14. The body of the blade is disposed at an angular inclination having its lower tapered end projecting forwardly and its upper extremity bent at an obtuse angle to provide a horizontal blade arm 18. The blade arm is disposed immediately above the lower body arm and is curved outwardly to facilitate the distribution of the weeds. It is readily apparent from Figure 1 of the drawing that the blade arm 18 is disposed at the forward portion of the U-shaped body so that the weeds are carried up the blade and distributed upon one side of the standard. This construction will prevent the standard engaging and carrying any weed growth during the progress of the cultivator and will cause the quack grass to be deposited upon the upper surface of the ground where it will be dried and destroyed.

It is to be understood that the form of my invention as shown and described is to be taken as the preferred example of same, and that various changes as to the shape and size thereof may be resorted to without departing from the spirit of the invention or the scope of the subjoined claims.

Having thus described my invention, I claim:

1. A device of the character described comprising a support standard having an intermediate portion offset rearwardly, and a sub-surface blade rigidly secured to the lower forward end of the standard disposed at an angular position having its lower end sharpened and projecting forwardly and its upper end extending rearwardly and disposed in a horizontal plane.

2. An implement of the class described comprising a support standard having a U-shaped body, an angular bracket forming the lower end of the body, a cultivator blade secured to the said bracket having its lower end tapered and projecting forwardly, and a rearwardly extending horizontal arm formed on the upper end of the said blade.

3. An agricultural implement comprising a support standard including a U-shaped body extending in a horizontal position, a vertical arm formed on the upper forward end of the body and projecting upwardly, an angular bracket formed on the lower forward end of the body, a cultivator blade secured to the standard bracket and disposed at an angular position, the lower end of the blade being tapered to form a fine point and projecting forwardly, and a distributing arm formed on the upper end of the blade disposed at a horizontal plane and curved laterally of the blade and standard.

4. In a cultivator, a support standard including a U-shaped body disposed at a horizontal position comprising an upper horizontal leg and a lower essentially longer horizontal leg, a vertical arm formed at the forward end of the upper leg and projecting upward, a supporting bracket formed at the forward end of the lower leg and projecting downwardly at an angular inclination, the said bracket being adaptable for connection with a cultivator blade, and a blade secured to the bracket.

5. In a cultivator including an offset standard, a cultivator blade having an elongated body and having its lower extremity tapered and projecting forwardly, and a distributing arm formed on the upper end of the blade body disposed at an obtuse angle with and extending rearwardly from the body and curved to provide a lateral offset at its rear end.

In testimony whereof I affix my signature.

ALFRED J. PETERSON.